United States Patent [19]

Williams et al.

[11] 4,011,532

[45] Mar. 8, 1977

[54] FAST ACTING WAVEGUIDE COUPLER

[75] Inventors: Norman P. Williams, Linthicum Heights; Roald N. Horton, Ellicott City; Frank A. Ruff, Annapolis, all of Md.

[73] Assignee: The United States of America as represented by the Secretary of the Air Force, Washington, D.C.

[22] Filed: Jan. 14, 1976

[21] Appl. No.: 649,107

[52] U.S. Cl. .............................. 333/98 R; 285/406; 285/420; 333/95 R

[51] Int. Cl.[2] ...................... H01P 1/04; F16L 37/00

[58] Field of Search ............. 333/98 R, 97 R, 95 R; 285/405, 406, 408, 414, 415, 420, 425, DIG. 8; 308/2 R; 292/256, 256.75, 257

[56] References Cited

UNITED STATES PATENTS

| | | | |
|---|---|---|---|
| 2,526,754 | 10/1950 | Johnson et al. | 292/85 X |
| 2,643,139 | 6/1953 | Hamilton | 333/98 X |
| 2,862,728 | 12/1958 | Druschel et al. | 285/406 X |
| 3,266,857 | 8/1966 | Anderson | 308/2 R X |
| 3,695,635 | 10/1972 | Paddington | 285/406 X |
| 3,821,670 | 6/1974 | Thompson | 333/98 R |

*Primary Examiner*—Alfred E. Smith
*Assistant Examiner*—Marvin Nussbaum
*Attorney, Agent, or Firm*—Joseph E. Rusz; Willard R. Matthews, Jr.

[57] ABSTRACT

Two waveguide structures are coupled by connector members that are slideably engaged to one waveguide and adaptable to fixed engagement with the other. Tapered threaded locking pins are threaded through a portion or extension of the waveguide structure that accommodates the slideable end of the connector members. The tapered end of each locking pin engages a tapered recess in a connector member. Longitudinal translation and fixed coupling of the two waveguide structures is achieved by screwing the tapered ends of the locking pins into full registration with the tapered recesses in the connector members. The connector members can be rotatable about the locking pins and partial retraction of the locking pins permits ready disengagement of the connector members from the other waveguide.

6 Claims, 6 Drawing Figures

FAST ACTING WAVEGUIDE COUPLER

STATEMENT OF GOVERNMENT INTEREST

The invention described herein may be manufactured and used by or for Government for governmental purposes without the payment of any royalty thereon.

BACKGROUND OF THE INVENTION

This invention relates to coupling devices for mechanical structure, and in particular to fast acting coupling and locking means for electromagnetic wave waveguides and to the mating of such waveguides to electrical structures.

There has existed for a number of years a need for devices to join pieces of waveguide to each other or to other electrical parts in such fashion that time to couple or uncouple be minimized, registration of the parts be accurate, and joining forces be sufficient to prevent significant quantities of radio frequency energy from leaking from the joint under static and dynamic mechanical stresses. Further, requirements for such joining devices include minimization of space required and the ability to be operated with limited access for fingers or tools.

One current method of joining structures of this type comprehends the use of bolted flanges. Joints of this type also sometimes include guide pins for registration. These joints require considerable space for tools and hand access. They involve axial relative motion of the waveguide to disengage the pins, and frequently cause damage to flanges as a result of the pins scratching the critical flange surfaces. Joints of this type also require excessive time to operate.

Lever operated clamps of over-center action are also commonly employed as coupling devices. Connections of this type rely on relatively low spring forces to accomplish clamping. These typically require considerable space for movement of the lever and excessive space for access for hands or tools. Also, the springs allow the flange faces to separate under static and dynamic loading resulting in leakage of RF energy and pressurizing gases, if used.

Another state-of-the-art approach to the problem utilizes mechanical linkages with rigid members. These generally require numerous close-tolerance parts, which degrade reliability and incur excessive cost. Wear of parts with use can also cause failure of these joints.

There currently exits, therefore, the need for a waveguide coupler that avoids the above problems. Such a coupler should be mechanically simple, employ no springs, and require very little space. It should also be capable of fast operation with minimal tool access. It is necessary that the resultant joint be mechanically and electrically tight through normal ranges of environmental stress. The present invention is directed toward satisfying these and other needs.

SUMMARY OF THE INVENTION

Waveguides and other electrical structures are coupled by means of connector members or pawls. The pawls are disposed on opposite sides of the structure to be coupled. Each pawl is connected to one structure so as to be rotatable about a threaded tapered pin. The pawls can be rotated to clamp or engage the distal edge of a flange on the other structure or waveguide. A tapered recess in the pawls, into which the tapered pins fit, provides translation of the structures into locking and release positions in response to insertion and retraction of the threaded tapered pins.

It is a principal object of the invention to provide new and improved means for coupling waveguides and other electrical structures.

It is another object of the invention to provide waveguide couplers that are fast acting and capable of accurate registration of parts.

It is another object of the invention to provide waveguide couplers having joining forces that are sufficient to prevent significant quantities of radio frequency energy from leaking from the coupling joint under static and dynamic mechanical stresses.

It is another object of the invention to provide fast acting waveguide couplers that minimize the space required and that can be operated with limited access for fingers or tools.

These, together with other objects, features and advantages of the invention, will become more readily apparent from the following detailed description when taken in conjunction with the illustrative embodiments in the accompanying drawings.

DETAILED DESCRIPTION OF THE PREFERRED EMBODIMENTS

Figure 1:
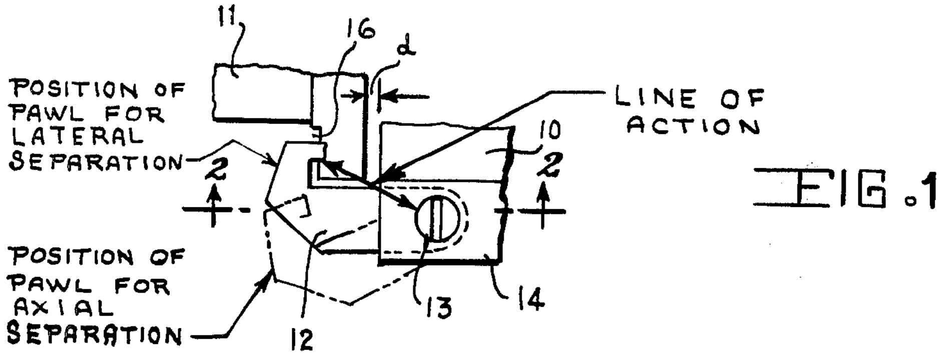
FIG. 1 is a top view detail of the connecting mechanism of a coupler comprehended by the invention.
Figure 2:
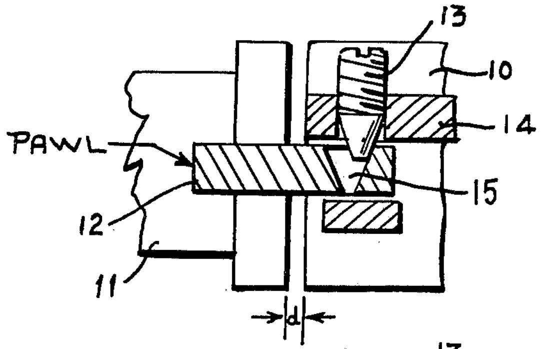
FIG. 2 is a sectional view of the connecting mechanism of FIG. 1 showing the coupler in an open position.
Figure 3:
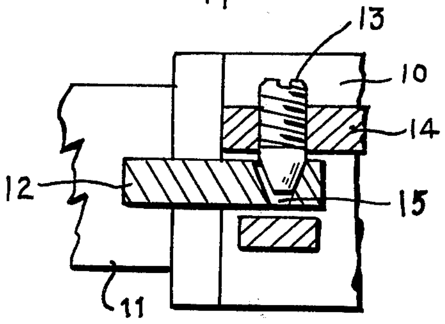
FIG. 3 is a sectional view of the connecting mechanism of FIG. 1 showing the coupler in a closed position.

Referring now to FIGS. 1–3, thereis illustrated thereby details of the clamping mechanism utilized in the preferred embodiment of the invention. A first waveguide or electrical component 10 is coupled to flanged waveguide 11 by connecting member or pawl 12. Pawl 12 is slidably and rotatably connected to electrical component 10 by means of threaded tapered pin 13 which is threaded through extension 14 of electrical component 10.

In practice, the invention employs the use of two pivoted pawls which engage the back surface of the waveguide flange adjacent to the wider side of the waveguide. The pivot pin 13 on the mating electrical part (electrical component 10) is a tapered pin with screw threads on a cylindrical portion. The mating hole 15 in the pawl 14 is also tapered. Dimensions of the pawl are such that when the pin is driven partially in, the clearance that exists in the open position becomes zero and a large force is applied to the guide. In operation, when the tapered pin 13 is in the open position, as illustrated in FIG. 2, sufficient clearance *d* exists to allow the waveguide 11 to move laterally out of the pawls 12, or for the pawls to rotate out of engagement allowing axial separation of the components. The amount of clearance *d* required depends on the direction of separation desired and whether a gasket is used between the flange faces.

When the tapered pin is driven in, as illustrated by FIG. 3, the pawls translate until the distance *d* is traveled, at which time the joint is closed and any desired force may be applied by controlling the torque on the screw.

In FIG. 1, grooves 16 are shown on the back of the waveguide flange. This is because the line of action of the closing force is such that a component of this force tends to cause the pawl to rotate away from the waveguide, resisted only by friction. Theory and experiment indicate that for more than a small angle, the friction force is not adequate, and a groove is required.

Figure 4:
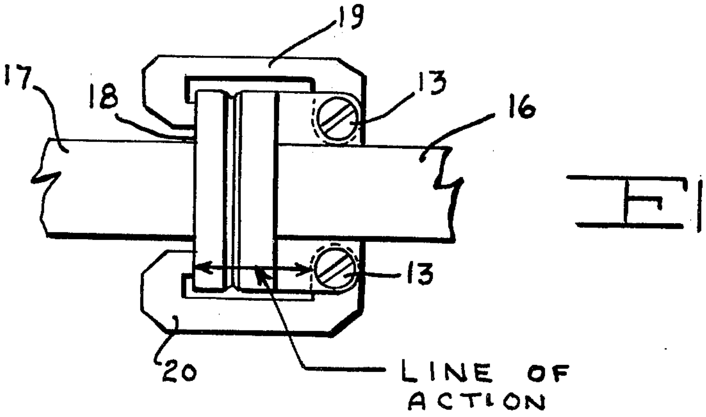
FIG. 4 is a top view of waveguides coupled by an alternative connecting mechanism.

FIG. 4 illustrates an alternative embodiment of the invention that overcomes this problem. In FIG. 4 two pieces of waveguide 16, 17 are depicted. Here the tapered pins 13 can be located by means of "C" shaped members 19, 20, such that the line of action of the closing force is normal to the flange surface 18 and the grooves may be eliminated, reducing costs.

Figure 5:
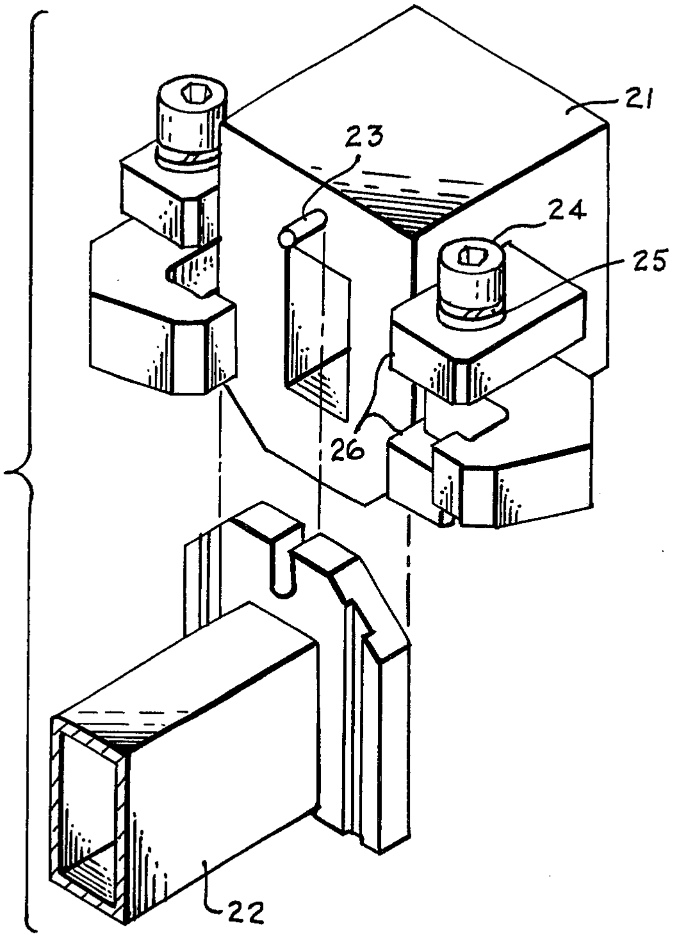
FIG. 5 is an isometric view of one presently preferred embodiment of the invention.

FIG. 5 depicts a direct application of the above-described features. It illustrates the connection of waveguide hybrid coupler 21 to a piece of waveguide 22. Waveguide 22 is shown separated from and below hybrid coupler 21 for clarity. The hybrid coupler 21 is attached to an equipment package (not shown) which is to be placed into an equipment bay in which a fixed piece of waveguide is waiting to receive the mating component. An alignment pin 23 and alignment surfaces 26 on the hybrid coupler insure precise alignment of the functional waveguide surfaces. Once the tapered pins clamp with the desired force, they are locked by turning an internal wrenching lock nut 24 against a lock washer 25.

A further virtue of the tapered pin is that, in the clamped position, resistance to loosening under vibration forces is provided by the spring action of the tapered portion, which deflects slightly as a cantilevered beam. A relatively large rotation of the pin must occur before the clamping force is removed. The lock washer limits any loosening to a small angle of rotation thus insuring a secure joint.

Figure 6:
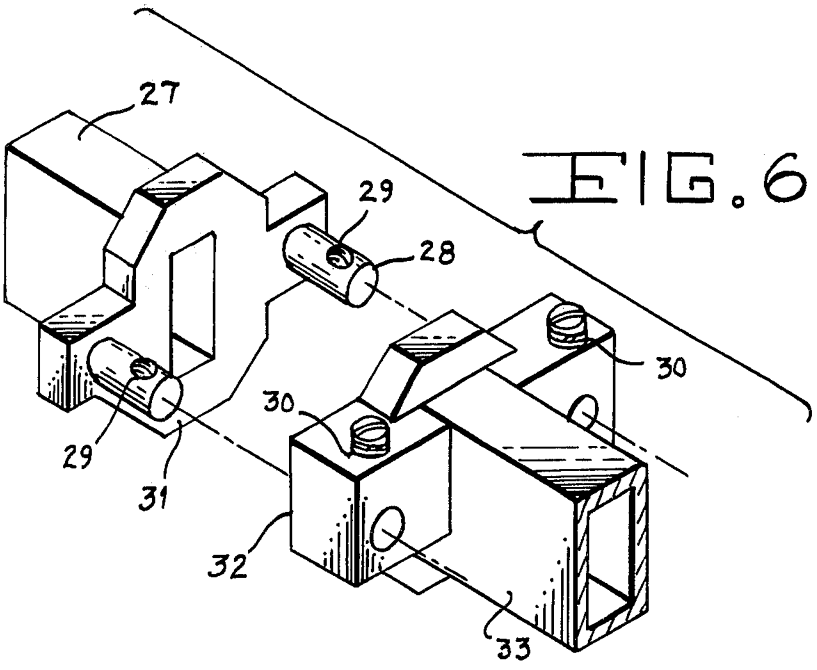
FIG. 6 is an isometric view of another embodiment of the invention.

One alternate device incorporating the principles of the invention is depicted in FIG. 6. In this embodiment the flange of waveguide 27 has guide pins 28 that have tapered holes 29 shaped to receive the tapered ends of pins 30 when the coupling surface 31 of waveguide 27 closely abuts the coupling surface 32 of waveguide 33. The arrangement, of course, also employs tapered pins to obtain the desired positive clamping force. However, it suffers the disadvantages that (1) the force is applied further from the guide walls, increasing sensitivity to flange flatness and bending stresses, (2) separation of the two pieces requires considerable axial movement before the guide pins disengage, and (3) considerably more motion of the tapered pin (i.e., many more turns on the screw) is necessary before the guide pin may move axially. On the other hand, it has the advantages of simplicity and the fact that the guide pins provide all necessary alignment.

While the invention has been described in terms of presently preferred embodiments, it is understood that the words which have been used are words of description rather than words of limitation and that changes within the purview of the appended claims may be made without departing from the scope and spirit of the invention in its broader aspects.

What is claimed is:

1. Means for coupling first and second structural members comprising flange means extending the coupling surface of said first structural member, and clamp means connected to lock the coupling surfaces of said structural members together, said clamp means comprising at least one connector means slideably engaged with said second structural member and adaptable to fixed engagement with the flange of said first structural member, the slideable end of each connector means having a cone-shaped recess therein, and a threaded member having a cone-shaped end portion associated with each connector means, each said threaded member being threaded through a portion of said second structural member and positioned to matingly engage its cone-shaped end portion in the cone-shaped recess of its associated connector means.

2. Means for coupling first and second structural members as defined in claim 1 wherein said first and second structural members are electromagnetic wave waveguides arranged in an end-to-end coupling arrangement.

3. Means for coupling first and second structural members as defined in claim 2 wherein each said connector means is rotatable about its associated threaded member.

4. Means for coupling first and second structural members as defined in claim 3 wherein said flange means is notched to accommodate locking engagement of said connector means.

5. Means for coupling first and second structural members as defined in claim 4 wherein said connector means has a "C" shaped configuration and the point of fixed engagement with said flange means is in linear alignment with said threaded member.

6. Means for coupling first and second structural members as defined in claim 1 wherein said connector means comprises guide pins affixed to and protruding from the coupling surface of said flange means.

* * * * *